United States Patent
Liang et al.

(10) Patent No.: US 8,959,394 B2
(45) Date of Patent: Feb. 17, 2015

(54) ELECTRONIC DEVICE, SYSTEM, AND METHOD FOR TESTING EXCEPTION HANDLING MECHANISM

(71) Applicants: Hong Fu Jin Precision Industry (ShenZhen) Co., Ltd., Shenzhen (CN); Hon Hai Precision Industry Co., Ltd., New Taipei (TW)

(72) Inventors: Xiao Liang, Shenzhen (CN); Ming Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 269 days.

(21) Appl. No.: 13/674,910

(22) Filed: Nov. 12, 2012

(65) Prior Publication Data

US 2013/0318400 A1    Nov. 28, 2013

(30) Foreign Application Priority Data

May 25, 2012    (CN) .......................... 2012 1 0165722

(51) Int. Cl.
*G06F 11/00* (2006.01)
*G06F 11/22* (2006.01)
*G06F 11/26* (2006.01)

(52) U.S. Cl.
CPC .......... *G06F 11/006* (2013.01); *G06F 11/2215* (2013.01); *G06F 11/26* (2013.01)
USPC ....................................................... 714/15

(58) Field of Classification Search
CPC ..................................... G06F 11/00
USPC .......................................................... 714/15
See application file for complete search history.

(56) References Cited

U.S. PATENT DOCUMENTS

| | | | | |
|---|---|---|---|---|
| 5,889,978 | A * | 3/1999 | Jayakumar | 703/27 |
| 5,951,696 | A * | 9/1999 | Naaseh et al. | 714/34 |
| 5,995,743 | A * | 11/1999 | Kahle et al. | 703/21 |
| 6,145,103 | A * | 11/2000 | Typaldos et al. | 714/55 |
| 6,889,167 | B2 * | 5/2005 | Curry, III | 702/183 |
| 6,959,262 | B2 * | 10/2005 | Curry, III | 702/183 |
| 7,240,343 | B2 * | 7/2007 | Ogasawara | 717/158 |
| 7,320,114 | B1 * | 1/2008 | Jain et al. | 716/106 |
| 7,370,293 | B2 * | 5/2008 | Yamagata | 716/102 |
| 7,496,788 | B1 * | 2/2009 | Alfieri et al. | 714/21 |
| 2001/0034751 | A1 * | 10/2001 | Eto et al. | 709/100 |
| 2003/0018961 | A1 * | 1/2003 | Ogasawara | 717/158 |
| 2006/0206749 | A1 * | 9/2006 | Narayanan Nair et al. | 714/4 |
| 2012/0284007 | A1 * | 11/2012 | Letz et al. | 703/14 |

* cited by examiner

*Primary Examiner* — Amine Riad
(74) *Attorney, Agent, or Firm* — Novak Druce Connolly Bove + Quigg LLP

(57) ABSTRACT

A method for testing exception handling mechanism of an electronic device, the method includes: establishing a connection between the electronic device and another electronic device when the electronic device is booting up. Obtaining parameters of a timer of the electronic device in response to an operation of a user, and determining whether the parameters are satisfied by the another electronic device. Simulating an abnormal event to cause the electronic device not to start up successfully if the parameters are satisfied by the another electronic device. Determining that the exception handling mechanism of the electronic device works well when the parameters do satisfy the requirement and when the other electronic device is in fact restarted or turned off after an abnormal event has been simulated via the other electronic device.

14 Claims, 3 Drawing Sheets

ELECTRONIC DEVICE, SYSTEM, AND METHOD FOR TESTING EXCEPTION HANDLING MECHANISM

BACKGROUND

1. Technical Field

The present disclosure relates to electronic devices, and particularly to an electronic device with an exception handling mechanism, a system, and a method capable of testing an exception handling mechanism.

2. Description of Related Art

Electronic devices, such as smart phones, electronic readers, and computers, usually have exception handling mechanism. For example, when the electronic device to crash or displays the "blue screen of death", the electronic device can be restarted due to the exception handling mechanism. To guarantee that the exception handling mechanism of the electronic devices works well, a related test for the exception handling mechanism is needed before the electronic devices leave the factory. The method for testing the exception handling mechanism of related art is to simulate an abnormal event by the electronic device itself to trigger the electronic device to run the exception handling mechanism, and detect whether the electronic device is restarted to determine whether the exception handling mechanism works well. However, such method is only capable of testing the exception handling mechanism when the electronic device is already running within an operating system environment. If the electronic device is booting up, the electronic device cannot simulate the abnormal event and the exception handling mechanism cannot be tested.

Therefore, an electronic device, a method, and a system, for testing an exception handling mechanism, to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
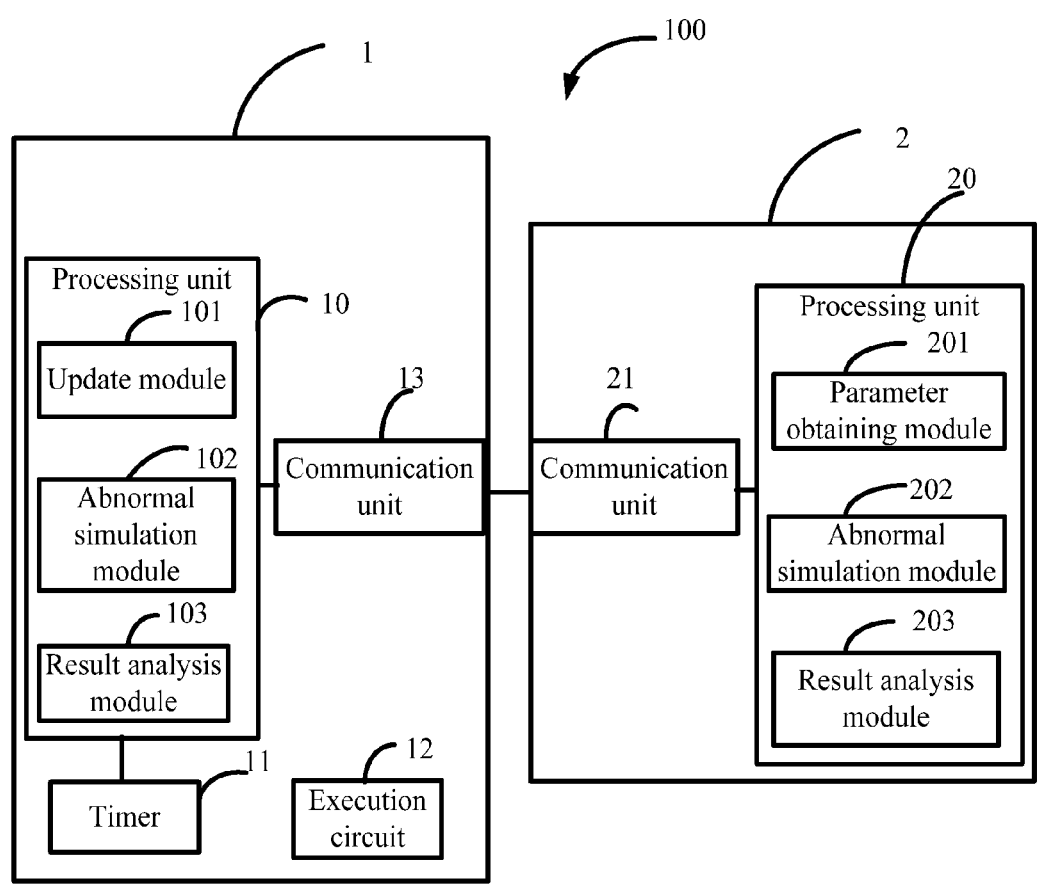
FIG. 1 is a block diagram of a system for testing exception handling mechanism of an electronic device, in accordance with an exemplary embodiment.

FIG. 1 illustrates an embodiment of a system 100 for testing the exception handling mechanism. The system 100 includes a first electronic device 1 and a second electronic device 2. The first electronic device 1 is an electronic device needing to be tested. The first electronic device 1 can be a computer, a smart phone, an electronic reader, or a digital photo frame, for example. The second electronic device 2 can also be a computer, smart phone, digital photo frame, or electronic reader. The first electronic device 1 and the second electronic device 2 can be the same or be different devices. For example, the first electronic device 1 is a smart phone, and the second electronic device 2 is a computer.

As shown in FIG. 1, the first electronic device 1 includes a processing unit 10, a timer 11, an execution circuit 12, and a communication unit 13. The processing unit 10 includes an update module 101, an abnormal simulation module 102, and a result analysis module 103. The update module 101 repeatedly updates the timer 11 after the lapse of a first predetermined time t1. In the embodiment, the timer 11 is a countdown timer and counts down from a timing length t2 when the timer 11 starts the countdown period. In the embodiment, the first predetermined time t1 is shorter than the timing length t2, the timer 11 is updated and reset with the timing length t2 again before the timer 11 counts down to zero. As is well known, if the exception handling mechanism of the first electronic device 1 is operating properly, when the first electronic device 1 suddenly crashes, the update module 101 cannot update the timer 11 and the timer 11 counts down to zero and outputs an interrupt signal to the execution circuit 12 when it has counted down to zero. The execution circuit 12 then turns off or restarts the first electronic device 1 when an interrupt signal is received. Then, if the exception handling mechanism of the first electronic device 1 works well, when the first electronic device 1 crashes suddenly, the first electronic device 1 will be restarted or turned off.

The abnormal simulation module 102 is used to simulate an abnormal event in response to an operation of a user after the first electronic device 1 has booted up and entered an operating system environment. In the embodiment, the abnormal event is a crash event, such as a blue screen of death event.

The result analysis module 103 detects whether the first electronic device 1 is restarted or turned off, to determine whether the exception handling mechanism of the first electronic device 1 works well, after the abnormal simulation module 102 has simulated the abnormal event. In detail, the result analysis module 103 detects whether the timer 11 outputs the interrupt signal and detects whether the execution circuit 12 executes its function, namely that the execution circuit 12 does restart or turn off the electronic device 1 after abnormal simulation module 102 has simulated the abnormal event, and produces corresponding test result. If the first electronic device 1 is restarted or turned off, the result analysis module 103 determines that the exception handling mechanism of the first electronic device 1 works well when the first electronic device 1 has entered the operating system environment. The operating system can be a Windows or any other operating system.

In the embodiment, the first electronic device 1 also includes a communication unit 13. The second electronic device 2 includes a processing unit 20 and a communication unit 21. The communication unit 21 communicates with the communication unit 13 of the first electronic device 1. The processing unit 20 includes a parameter obtaining module 201, an abnormal simulation module 202, and a result analysis module 203. In the embodiment, the communication units 13 and 21 can be wired ports, such as USB ports, PS/2 ports, and iEEE1394 ports.

When the first electronic device 1 is booting up and has not yet entered the operating system environment, the second electronic device 2 tests the exception handling mechanism of the first electronic device 1, in response to the operation of the user. The user connects the first electronic device 1 with the second electronic device 2 via the communication units 13 and 21 and triggers the second electronic device 2 to test the exception handling mechanism of the first electronic device 1 via operating a preset button or a menu.

In detail, the parameter obtaining module 201 obtains parameters of the timer 11 of the first electronic device via the communication units 13 and 21, and determines whether the parameters satisfy a requirement, in response to the operation of the user. In the embodiment, the parameters of the timer 11 include the timing length t2 of the timer 11, the parameter obtaining module 201 determines whether the timing length t2 of the timer 11 is less than a predetermined period of time t3 to determine whether the parameters in fact satisfy the requirement.

Normally, the first electronic device 1 is in a final stage of the bootup process and is about to enter the operating system environment when the timer 11 is activated and starts to count down the timing length t2. If the first electronic device is booting up normally, the first electronic device 1 enters the operating system environment before the timer 11 has counted down to zero. If the first electronic device 1 is not booting up properly, and hangs at some stage, then the timer 11 counts downs to zero and outputs the interrupt signal to trigger the execution circuit 12 to restart or turn off the first electronic device 1. Normally, the first electronic device 1 will enter the operating system environment within the predetermined period of time t3, thus the timing length t2 of the timer 11 should be substantially less than the predetermined period of time t3 to ensure that the first electronic device 1 can be restarted or turned off in case the process of booting up of the first electronic device 1 is abnormal.

If the parameter obtaining module 201 determines that the parameters do not satisfy the requirement, namely that the timing length t2 of the timer 11 is longer than the predetermined period of time t3, the result analysis module 203 determines that the exception handling mechanism of the first electronic device 1 does not work well, and records a test record.

If the parameter obtaining module 201 determines that the parameters do satisfy the requirement, namely that the timing length t2 of the timer 11 is less than the predetermined period of time t3, the abnormal simulation module 202 simulates an abnormal event and prevents the first electronic device 1 from entering the operating system environment. The result analysis module 203 detects whether the first electronic device 1 is restarted or turned off after the abnormal simulation module 202 has simulated the abnormal event. If the first electronic device 1 is not restarted or turned off, the result analysis module 203 determines that the exception handling mechanism of the first electronic device 1 does not work well.

In the embodiment, when the first electronic device 1 is booting up, the result analysis module 203 determines that the exception handling mechanism of the first electronic device 1 works well only when the parameters of the timer 11 in fact satisfy the requirement and when the first electronic device 1 is actually restarted or turned off after the abnormal simulation module 202 has simulated the abnormal event.

In one embodiment, the first electronic device 1 itself tests the exception handling mechanism after the first electronic device 1 has entered the operating system environment, and the second electronic device 2 tests the exception handling mechanism of the first electronic device 1 during the bootup process of the first electronic device 1.

In another embodiment, it is the second electronic device 2 which tests the exception handling mechanism of the first electronic device 1 when the first electronic device 1 is booting up or after the first electronic device 1 has entered the operating system environment. Namely, in this other embodiment, the abnormal simulation module 202 and the result analysis module 203 of the second electronic device 2 also execute their functions of testing the exception handling mechanism of the first electronic device 1 after the first electronic device has entered the operating system environment.

Figure 2:
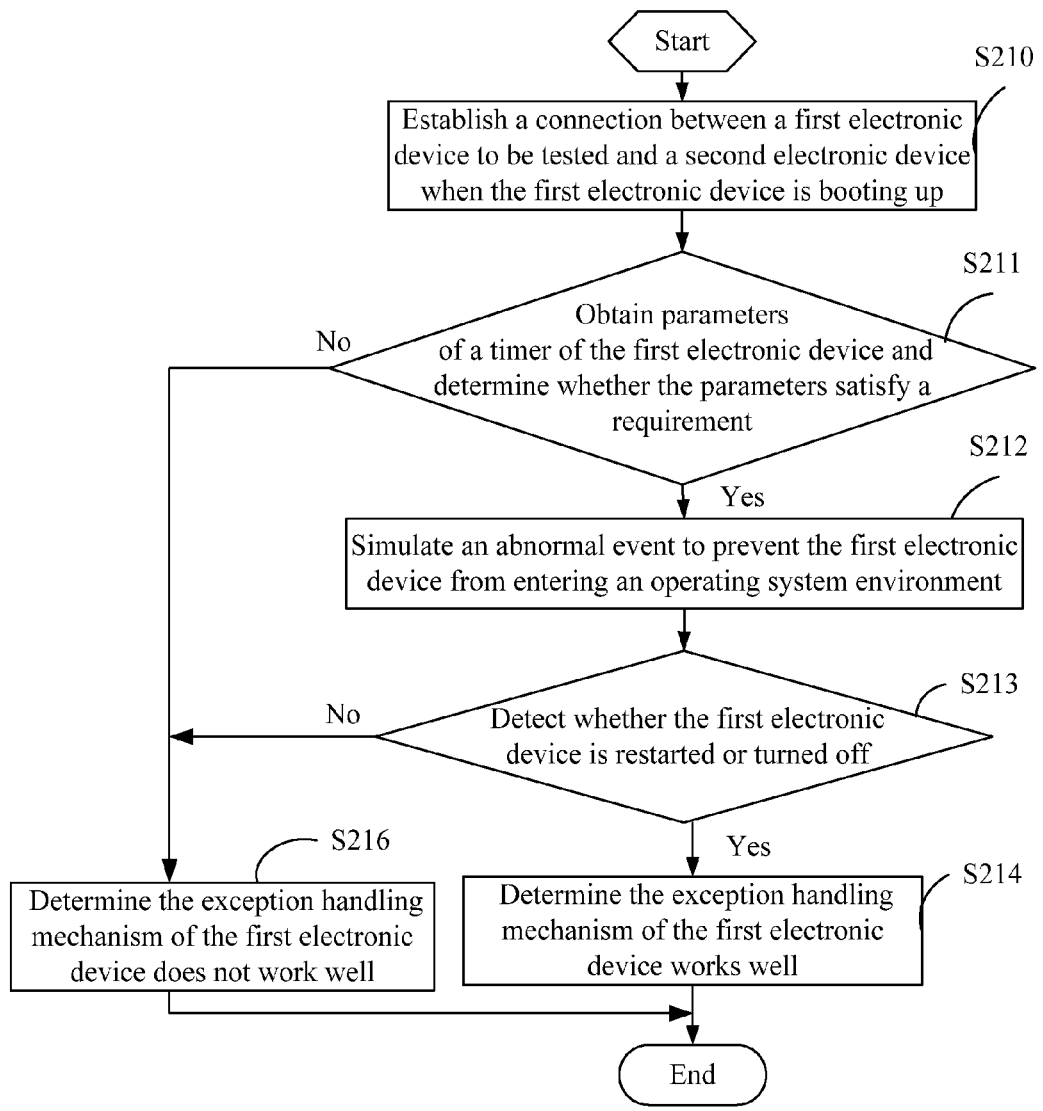
FIG. 2 is flowchart illustrating a method for testing exception handling mechanism of an electronic device when the electronic device is booting up, applied in a system, such as that of FIG. 1, in accordance with an exemplary embodiment.

Referring to FIG. 2, a flowchart illustrates a method for testing exception handling mechanism of the first electronic device 1 when the first electronic device 1 is booting up and before it has entered an operating system environmentThe method is applied in the system 100 as shown in FIG. 1. In step S210, a connection between the first electronic device 1 and the second electronic device 2 is established when the device is booting up, in response to user's operation.

In step S211, the parameter obtaining module 201 obtains parameters of the timer 11 of the first electronic device 1 via the communication units 13 and 21, and determines whether the parameters satisfy the requirement. In the embodiment, the parameters of the timer 11 include the timing length t2 of the timer 11, the parameter obtaining module 201 determines whether the timing length t2 of the timer 11 is less than a predetermined time t3 and produces a result of comparison accordingly.

If the parameters do not satisfy the requirement, the process goes to step S216. Otherwise, in step S212, the abnormal simulation module 202 simulates an abnormal event and prevents the first electronic device 1 from entering the operating system environment.

In step S213, the result analysis module 203 detects whether the first electronic device 1 is in fact restarted or turned off after the abnormal simulation module 202 has simulated the abnormal event.

If the first electronic device 1 is not actually restarted or turned off, the process goes to step S216. Otherwise, in step S214, the result analysis module 203 determines that the exception handling mechanism of the first electronic device 1 works well.

In step S216, the result analysis module 203 determines that the exception handling mechanism of the first electronic device 1 is not working well and records a test result.

Figure 3:
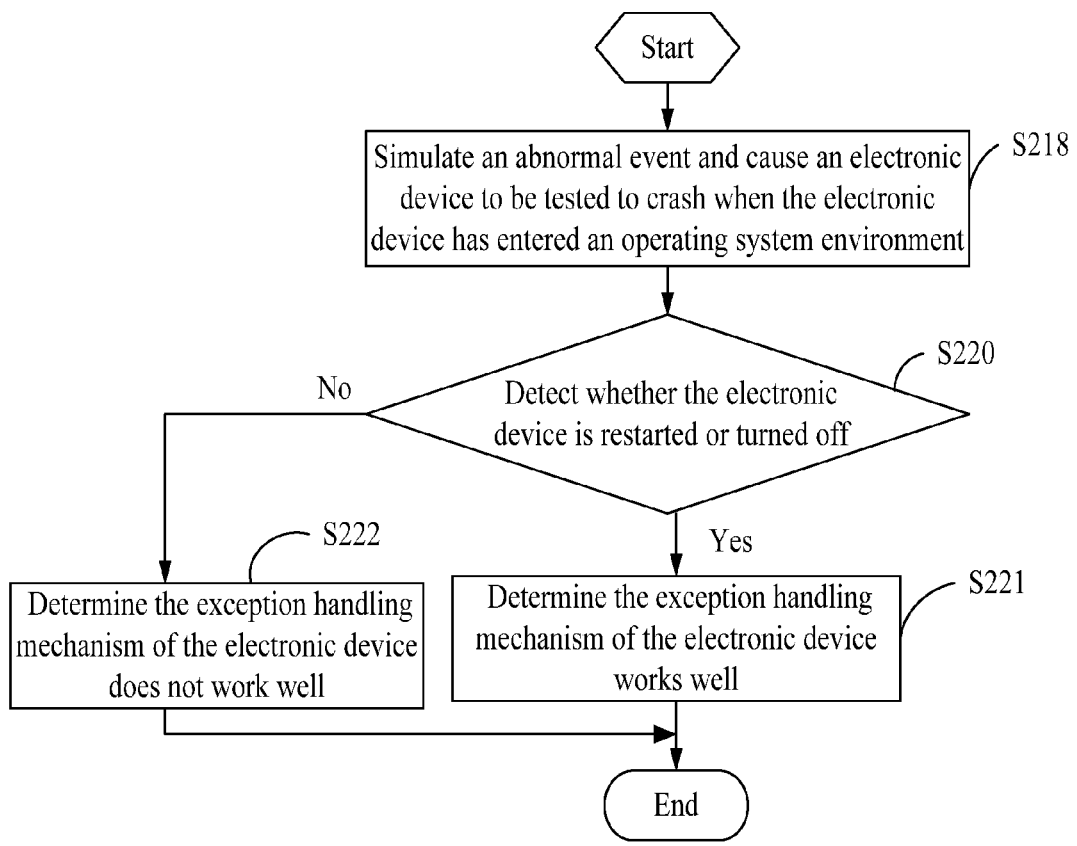
FIG. 3 is flowchart illustrating a method for testing exception handling mechanism of an electronic device after boot up, applied in a system, such as that of FIG. 1, in accordance with an exemplary embodiment.

Referring to FIG. 3, a flowchart illustrates a method for testing exception handling mechanism of the first electronic device 1 after the first electronic device 1 has entered an operating system environment. The method is applied in the system 100 as shown in FIG. 1.

In step S218, the abnormal simulation module 202/102 simulates an abnormal event and causes the first electronic device 1 to crash after the first electronic device has entered the operating system environment.

In step S220, the result analysis module 203/103 detects whether the first electronic device 1 is restarted or turned off after the abnormal simulation module 202/102 has simulated the abnormal event.

If the first electronic device 1 is not restarted or turned off, the process goes to step S222. Otherwise, in step S221, the result analysis module 203/103 determines that the exception handling mechanism of the first electronic device 1 works well.

In step S222, the result analysis module 203/103 determines that the exception handling mechanism of the first electronic device 1 is not working well and records a test result.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device for testing exception handling mechanism of a device to be tested, the electronic device comprising:
    a communication unit, configured to connect to the device to be tested; and
    a processing unit comprising:
        a parameter obtaining module, configured to obtain parameters of a timer of the device to be tested via the communication unit in response to an operation of a user when the device to be tested is booting up, and further configured to determine whether the parameters satisfy a requirement;
        an abnormal simulation module, configured to simulate a first abnormal event to prevent the device to be tested from entering an operating system environment successfully when the parameter obtaining module determines the parameters satisfy the requirement, and
        a result analysis module, configured to detect whether the device to be tested is restarted or turned off after the abnormal simulation module has simulated the first abnormal event, and determine that the exception handling mechanism of the device to be tested works well when the device to be tested is restarted or turned off after the abnormal simulation module has simulated the first abnormal event.

2. The electronic device according to claim 1, wherein the abnormal simulation module is further configured to simulate a second abnormal event to cause the device to be tested to crash in response to the operation of the user when the device to be tested has been started up, and the result analysis module is further configured to determine the exception handling mechanism of the electronic device to be tested works well when the device to be tested is restarted or turned off after the abnormal simulation module simulates the second abnormal event.

3. The electronic device according to claim 2, wherein, the parameters of the timer comprise a timing length, the parameter obtaining module determines the parameters satisfy the requirement device when determining the timing length is less than a predetermined period of time.

4. The electronic device according to claim 1, wherein the electronic device is one selected from the group consisting of a mobile phone, a digital photo frame, an electronic reader, and a computer.

5. A system, comprising:
    a first electronic device comprising:
    a timer; a first communication unit; and
    a processing unit comprising:
        a first abnormal simulation module, configured to simulate a first abnormal event to cause the first electronic device to crash in response to an operation of a user, when the first electronic device has entered an operating system environment, and
        a first result analysis module, configured to detect whether the first electronic device is restarted or turned off after the first abnormal simulation module has simulated the first abnormal event, and determine an exception handling mechanism of the first electronic device works well when the first electronic device is restarted or turned off after the first abnormal simulation module has simulated the first abnormal event; and
    a second electronic device comprising:
        a second communication module, configured to communicate with the first communication unit of the first electronic device;
        a parameter obtaining module, configured to obtain parameters of the timer of the first electronic device via the first communication unit and the second communication unit when the first electronic device is booting up, and further configured to determine whether the parameters satisfy a requirement;
        a second abnormal simulation module, configured to simulate a second abnormal event to prevent the first electronic device from entering the operating system environment successfully when the parameter obtaining module determines the parameters satisfy the requirement, and
        a second result analysis module, configured to determine the exception handling mechanism of the first electronic device works well when the first electronic device is restarted or turned off after the second abnormal simulation module has simulated the second abnormal event.

6. The system according to claim 5, wherein, the parameters of the timer comprises a timing length, the parameter obtaining module determines the parameters satisfy the requirement device when determining the timing length is less than a predetermined period of time.

7. The system according to claim 5, wherein the first electronic device further includes an execution circuit, if the exception handling mechanism of the first electronic device works well, when the first abnormal simulation module simulates the first abnormal event or the second abnormal simulation module simulates the second abnormal event, the timer countdowns to zero and outputs an interrupt signal, the execution circuit controls to restart or turn off the first electronic device when receiving the interrupt signal.

8. The system according to claim 5, wherein the first electronic device is one selected from the group consisting of a mobile phone, a digital photo frame, an electronic reader, and a computer.

9. The system according to claim 5, wherein the second electronic device is one selected from the group consisting of a mobile phone, a digital photo frame, an electronic reader, and a computer.

10. The system according to claim 5, wherein the first communication unit is one selected from the group consisting of a USB port, a PS/2 port, an iEEE1394 port, a Wifi module, and a BLUETOOTH module.

11. The system according to claim 5, wherein the second communication unit is one selected from the group consisting of a USB port, a PS/2 port, an iEEE 1394 port, a Wifi module, and a BLUETOOTH module.

12. A method for testing exception handling mechanism of an electronic device, the method comprising:
    establishing a connection between the electronic device and another electronic device when the electronic device is booting up;
    obtaining parameters of a timer of the electronic device in response to an operation of a user, and determining whether the parameters satisfy a requirement via the another electronic device;
    simulating a first abnormal event to prevent the electronic device from entering the operating system environment if the parameters satisfy the requirement via the another electronic device, and
    determining the exception handling mechanism of the device works well when the electronic device is restarted or turned off after the first abnormal event has been simulated via the another electronic device.

13. The method according to claim 12, further comprising:
simulating a second abnormal event to cause the electronic device to crash in response to the operation of the user when the electronic device has been started up via the electronic device or the another electronic device, and determining the exception handling mechanism of the electronic device works well when the electronic device is restarted or turned off after the second abnormal event has been simulated via the electronic device or the another electronic device.

14. The method according to claim 12, wherein, the parameters of the timer comprise a timing length, the step of "determining whether the parameters satisfy a requirement" comprises:
determining whether the parameters satisfy the requirement by determining whether the timing length is less than a predetermined period of time.

* * * * *